United States Patent [19]

Nakai et al.

[11] Patent Number: 4,912,498
[45] Date of Patent: Mar. 27, 1990

[54] CAMERA SYSTEM CAPABLE OF INTERCHANGING ITS OBJECTIVE LENS

[75] Inventors: Masaaki Nakai, Nara; Masayoshi Sahara, Sennan; Nobuyuki Taniguchi, Tondabayashi, all of Japan

[73] Assignee: Minolta Camera Kabushiki Kaisha, Osaka, Japan

[21] Appl. No.: 248,306

[22] Filed: Sep. 21, 1988

Related U.S. Application Data

[60] Continuation of Ser. No. 138,841, Dec. 23, 1987, abandoned, which is a continuation of Ser. No. 198, Jan. 2, 1987, abandoned, which is a division of Ser. No. 632,405, Jul. 19, 1984, Pat. No. 4,639,112, which is a continuation-in-part of Ser. No. 478,910, Mar. 25, 1983, Pat. No. 4,560,267.

[30] Foreign Application Priority Data

| Mar. 26, 1982 | [JP] | Japan | 57-49768 |
| Mar. 30, 1982 | [JP] | Japan | 57-52740 |
| Apr. 1, 1982 | [JP] | Japan | 57-55187 |
| Nov. 5, 1982 | [JP] | Japan | 57-194968 |
| Apr. 26, 1984 | [JP] | Japan | 59-85599 |

[51] Int. Cl.$^4$ ............................................. G03B 7/20
[52] U.S. Cl. ............................................. 354/442
[58] Field of Search ............................. 354/441–443, 354/455, 286, 289.12

[56] References Cited

U.S. PATENT DOCUMENTS

| 3,394,644 | 7/1968 | Ettischer | 354/455 X |
| 4,304,472 | 12/1981 | Shinoda et al. | 354/289.12 X |
| 4,320,944 | 3/1982 | Nakai | 354/443 |
| 4,329,034 | 5/1982 | Murakami et al. | 354/443 |
| 4,344,681 | 8/1982 | Yamada | 354/442 |
| 4,352,548 | 10/1982 | Toyoda | 354/443 |
| 4,477,164 | 10/1984 | Nakai et al. | 354/286 |
| 4,509,846 | 4/1985 | Nakai et al. | 354/442 |
| 4,540,262 | 9/1985 | Nakai et al. | 354/286 X |
| 4,541,700 | 9/1985 | Bletz et al. | 354/286 |
| 4,560,267 | 12/1985 | Nakai et al. | 354/286 X |
| 4,637,704 | 1/1987 | Ishimura et al. | 354/286 |
| 4,639,112 | 1/1987 | Nakai et al. | 354/286 X |
| 4,673,275 | 6/1987 | Nakai et al. | 354/286 X |

FOREIGN PATENT DOCUMENTS

| 48-11048 | 4/1973 | Japan . | |
| 54-108628 | 8/1979 | Japan | 354/289.12 |
| 54-147036 | 11/1979 | Japan . | |
| 56-135829 | 10/1981 | Japan . | |
| 56-155908 | 12/1981 | Japan . | |
| 57-5032 | 1/1982 | Japan . | |
| 57-5033 | 1/1982 | Japan . | |

Primary Examiner—W. B. Perkey
Attorney, Agent, or Firm—Price, Gess & Ubell

[57] ABSTRACT

A camera system comprising a camera body and an interchangeable lens assembly adapted to be coupled to the camera body. The interchangeable lens assembly has no manipulatable aperture adjusting ring, but has an aperture mechanism and a read-only memory both built therein. The read-only memory stores therein various data peculiar to such lens assembly. The camera body communicates with and power the lens assembly through a set of terminals connectable with associated terminals provided in the lens assembly. The terminals in each of the camera body and lens assembly are arranged in a generally arcuate row with the data transmitting terminal located at one extremity of the arcuate row on the leading side with respect to the direction of turn of the lens assembly which is effected when the lens assembly is to be completely coupled to the camera body.

11 Claims, 8 Drawing Sheets

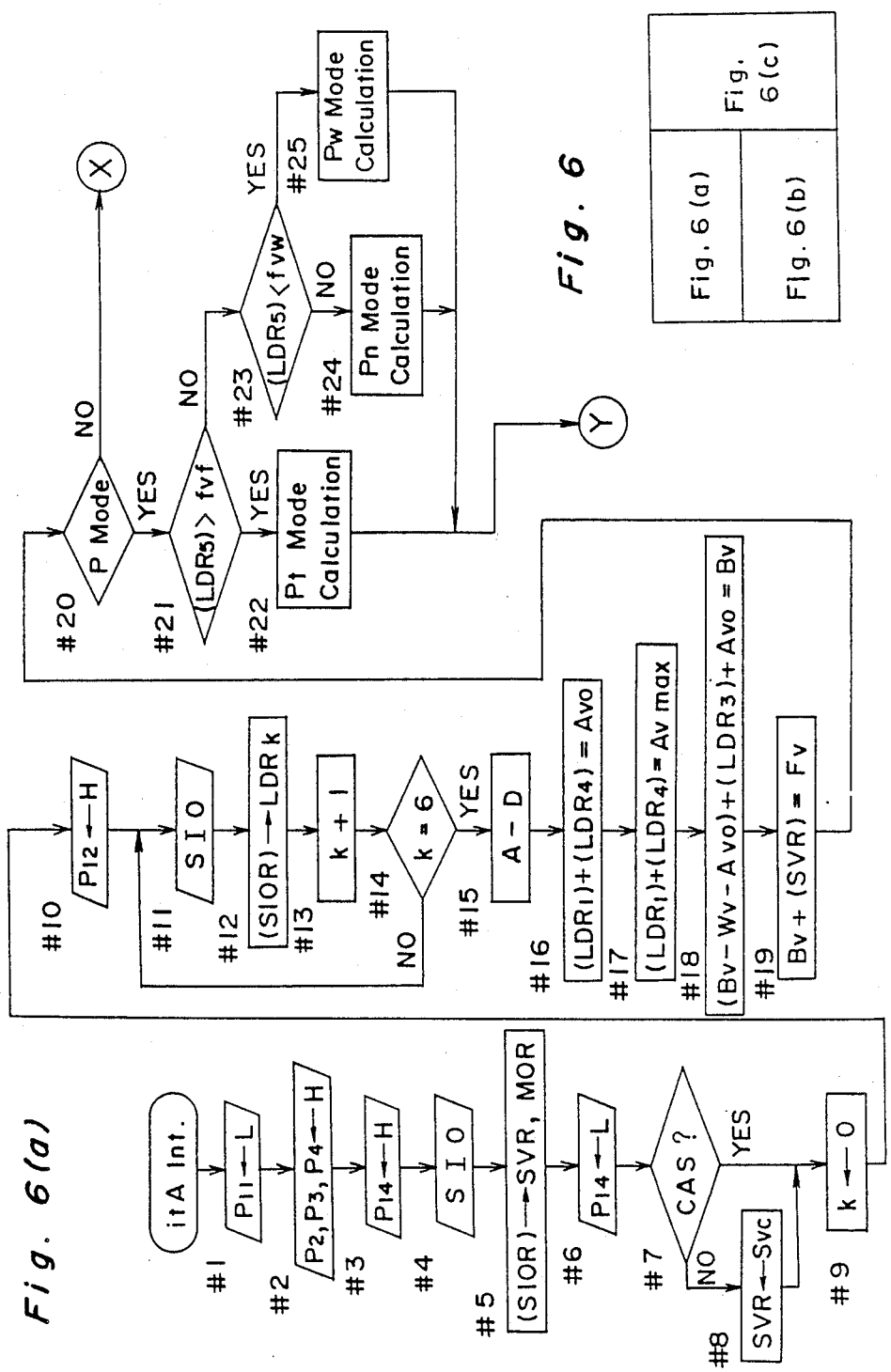

CAMERA SYSTEM CAPABLE OF INTERCHANGING ITS OBJECTIVE LENS

This is a continuation of application Ser. No. 138,841, filed Dec. 23, 1987, now abandoned which is a divisional application of abandoned Ser. No. 000,198, filed Jan. 2, 1987, which is a divisional application of Ser. No. 632,405, filed on July 19, 1984, now U.S. Pat. No. 4,639,112 which is a continuation in part application of Ser. No. 478,910, filed on Mar. 25, 1983 (issued as U.S. Pat. No. 4,560,267, on Dec. 24, 1985).

BACKGROUND OF THE INVENTION

1. Field of the Invention

The present invention generally relates to a photographic camera system utilizing interchangeable objective lens assemblies one at a time and, more particularly, to an improvement in coordination between the camera body and the interchangeable objective lens assembly then coupled thereto.

2. Description of the Prior Art

In a photographic camera system utilizable with interchangeable objective lens assemblies one at a time, one of the most important coordinations between the camera body and the lens assembly then coupled thereto lies in the manual aperture setting required to be performed at the time of manual exposure control, automatic exposure control under the aperture-priority mode, or the like. As is well known to those skilled in the art, interchangeable lens assemblies generally have a manipulatable aperture adjustment such as an aperture setting ring mounted exteriorly on the lens barrel for the access to a photographer.

On the other hand, there is also known a photographic camera system wherein the aperture adjustment is not provided on an interchangeable lens assembly, but on the body of a photographic camera so that the setting of the aperture adjustment can be transmitted to the lens assembly to control the aperture in such lens assembly. In this camera system, since the available aperture range, i.e., the available range from the maximum settable aperture (the smallest available f-stop number) to the minimum settable aperture (the largest available f-stop number), varies from one interchangeable lens assembly to another, a mechanism comprising a mechanical signaling element, provided in any one of the interchangeable lens assemblies and indicating the aperture range available in the respective lens assembly, and an engagement element provided in the camera body for engagement with the signaling element is employed to inhibit the aperture adjustment in the camera body to set the aperture of a value outside the available aperture range.

In either of the above described camera systems, there are many limitations and/or requirements imposed on the manufacture of the interchangeable lens assemblies such as, for example, a space for accommodating an arrangement necessary to permit the aperture setting ring to rotate, a precise arrangement of both the signaling element and the engagement element, the precise machining of the associated component parts and so on. These limitations and/or requirements often render the camera system as a whole to be complicated and expensive.

Another one of the most important coordinations between the camera body and the lens assembly lies in the transmission of various electric signals therebetween. Numerous techniques and arrangements have hitherto been utilized for transmitting electric signals through terminals between the camera body and the lens assembly. As is well known to those skilled in the art, the utmost care is required to permit the electric signals to be correctly transmitted between the camera body and the lens assembly and, therefore, an improvement has long been desired to avoid any possible inadvertent transmission of one or more of the electric signals from the camera body to the lens assembly or from the lens assembly to the camera body which would result in the erroneous operation of the camera.

SUMMARY OF THE INVENTION

An essential object of the present invention is to improve the conventional camera utilizing an interchangeable lens assembly to permit the camera system as a whole to be reasonably constructed and also to simplify the interchangeable lens assembly.

Another important object of the present invention is to provide an improved camera system wherein the manipulatable aperture adjustment is not provided on the interchangeable lens assembly, but on the body of a camera to permit the setting of the aperture of the lens assembly to be carried out on the side of the camera body.

A further object of the present invention is to provide an improved interchangeable lens assembly having its utility in the camera system of the type referred to above.

A still further object of the present invention is to improve the system so as to avoid the possibility that the camera body may process erroneous information in the event of the incorrect mounting of the lens assembly to the camera body.

A yet further object of the present invention is to provide an improved interchangeable lens assembly having its utility in the system of the type referred to in the preceding paragraph.

The present invention provides a camera system that includes a compatible camera body and interchangeable lens assembly particularly adaptable for automatic focusing. The camera body has a series of terminals for providing electrical power, enabling signals and clock signals plus the ability to receive information from the interchangeable lens assembly. The interchangeable lens assembly has complementary terminals and can have the ability to store various data peculiar to the specific lens assembly such as aperture size.

BRIEF DESCRIPTION OF DRAWINGS

These and other objects and features of the present invention will be readily understood by those skilled in the art upon the reading of the following description taken in conjunction with a preferred embodiment with reference to the accompanying drawings, in which:

FIG. 3(*b*) is a circuit diagram showing an electric circuit incorporated in the lens assembly according to the present invention;

DETAILED DESCRIPTION OF THE EMBODIMENT

Figure 1:
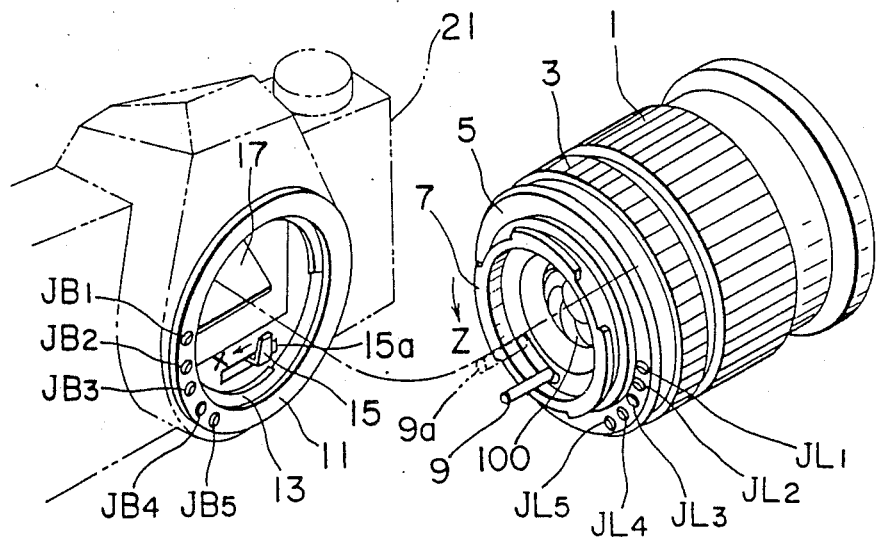
FIG. 1 is a perspective view showing an essential portion of the camera with an interchangeable lens assembly shown as separated therefrom.

Before the description of the present invention proceeds, it is to be noted that like parts are designated by like reference numerals throughout the accompanying drawings.

Referring first to FIG. 1 showing a combination of an interchangeable zoom lens assembly and the body of a photographic camera utilizable with the zoom lens assembly, the zoom lens assembly includes a distance setting ring 1 for setting the camera-to-object distance, and a zooming ring 3 for the adjustment of the focal length of the zoom lens assembly. When the zooming ring 3 is rotated, the focal length of the zoom lens assembly can be adjusted and, at the same time, a slide member provided in a focal length code plate FCP as shown in FIG. 3(b) slides a coded pattern in contact therewith to enable the code plate FCP to generate an output data indicative of the focal length to which the lens assembly has been set by the rotation of the zooming ring 3. The lens assembly has a rear end provided with a ring-shaped abutment plate 5 fixed coaxially thereto and carrying five electric terminals JL1 to JL5, said electric terminals JL1 to JL5 being arranged in a circle coaxial with the abutment plate 5 about the optical axis of the lens assembly. Rigidly mounted on the rear end of the lens assembly adjacent the abutment plate 5 is a coupling ring having a plurality of, for example, three, radially outwardly flanged bayonet pawls 7, the function of which will be described later. The lens assembly also has a stop-down pin 9 protruding axially outwardly from the rear end of the lens assembly and normally angularly biased by a spring in a direction shown by the arrow Z, said stop-down pin 9 being so operatively associated with an aperture control mechanism 100 built in the lens assembly that the aperture of the lens assembly can be adjusted to the minimum aperture size (the largest f-stop number) with the pin 9 located at the position shown by solid line and the full open aperture size (the smallest f-stop number) when the stop-down pin 9 is angularly moved to a position 9a shown by the broken line in a direction counter to the biasing direction Z.

The camera body 21 has a ring-shaped abutment plate 11 rigidly secured thereto for engagement with the abutment plate 5 fast with the lens assembly and carrying an equal number of electric terminals JB1 to JB5, said electric terminals JB1 to JB5 being so positioned and so arranged that, when and after the lens assembly has been completely coupled to the camera body 21 with the abutment plate 5 held in contact with the abutment plate 11, the terminals JB1 to JB5 on the camera body 21 can be electrically connected with the associated terminals JL1 to JL5 on the lens assembly, respectively. The camera abutment plate 11 has an equal number of bayonet flanges 13 extending radially inwardly therefrom and engageable with the lens bayonet pawls 7 when the lens assembly is mounted onto the camera body and subsequently turned in the direction Z so as to assume a locked position. It is to be noted that the complete coupling of the lens assembly to the camera body 21 is intended to mean that the lens assembly mounted onto the camera body 21 and then turned so as to assume the locked position is held in such locked position and that, although not shown because of the well known expedient in the related art, the camera body 21 is to be understood as provided with a releasable locking member for holding the lens assembly in the locked position. The camera body 21 also has an aperture stop-down control lever 15 having a side edge 15a engageable with the stop-down pin 9 when and after the lens assembly has been completely coupled. Accordingly, the aperture of the lens assembly depends on the position of the aperture stop-down control lever 15. Although in practice the aperture stop-down control lever 15 is spring-loaded so as to move in a direction shown by the arrow X, it is held in a position shown by the solid line during a period other than during the exposure control operation and, therefore, the aperture of the lens assembly is set to the maximum aperture size, i.e., the full open aperture size. When the exposure control operation takes place, the control lever 15 is disengaged from the solid line position to move in the direction X accompanied by the angular movement of the stop-down pin 9 in the direction Z with the aperture of the lens assembly consequently stopped down. After the control lever 15 has been moved in the direction X by a predetermined distance corresponding to the stopping-down degree to attain a required aperture size, the control lever 15 is brought to a halt and, at the same time, the stop-down pin 9 having been following to the control lever 15 is brought to a halt with the aperture of the lens assembly consequently set to the predetermined value. The camera body 21 also has a reflective mirror 17 supported for pivotal movement between an up position, at which the incoming light passing through the lens assembly is allowed to reach a photosensitive film, and a down position as shown and at which the incoming light is reflected towards a viewfinder of the camera.

To mount onto the camera body 21, the lens assembly is first inserted into the camera body 21 until the lens abutment plate 5 contacts the camera abutment plate 11 and then is turned in the direction Z to allow it to be held in the locked position. When the lens assembly is so locked, the bayonet pawls 7 are held in position between the bayonet flanges 13 and spring members (not shown) provided in the camera body 21 and positioned on one side of the bayonet pawls 7 opposite to the associated bayonet flanges 13 and, at the same time, the lens terminals JL1 to JL5 are aligned and electrically connected with the camera terminals JB1 to JB5, respectively. The paired terminals JB1 and JL1 are utilized to transmit data from the lens assembly onto the camera body; the paired terminals JB2 and JL2 are utilized to supply an electric power from the camera body onto the lens assembly; the paired terminals JB3 and JL3 are utilized to supply synchronizing clock pulses from the camera body onto the lens assembly; the paired terminals JB4 and JL4 are utilized to supply from the camera body onto the lens assembly a chip select signal necessary to activate a circuit built in the lens assembly; and the paired terminals JB5 and JL5 are utilized to make the ground common to both the camera body and the lens assembly.

As can readily be understood from FIG. 1, it is clear that, except for a mechanical linkage associated with the control of the lens aperture, no other mechanical linkage intended for the transmission of pieces of information is employed between the camera body and the lens assembly. Accordingly, not only can the lens assembly have enough space to spare, but also no substantial care is required in designing and machining component parts of the mechanical linkage necessitated to transmit a physical information concerned of the lens aperture.

In addition, since the paired terminals for the transmission of the electric signals are arranged in the manner as hereinabove described, the data transfer terminal JB1 on the camera body 21 contacts none of the lens terminals JL1 to JL5 during the mounting of the lens assembly and prior to the complete coupling of the lens assembly to the camera body, but contacts the associated lens terminal JL1 only when the lens assembly has been completely coupled to the camera body having been held in the locked position. Accordingly, as will be described later, even when the lens assembly is incompletely coupled to the camera body, there is no possibility that electric current may flow from any of the other terminals to this data transfer terminal through the circuit built in the lens assembly. This is advantageous in that the possibility is eliminated that the data may be destroyed by the current flowing from any of the other terminals while a microcomputer is in operation to transact the data with blocks other than the lens assembly, thereby permitting the data to be correctly read.

Figure 2:
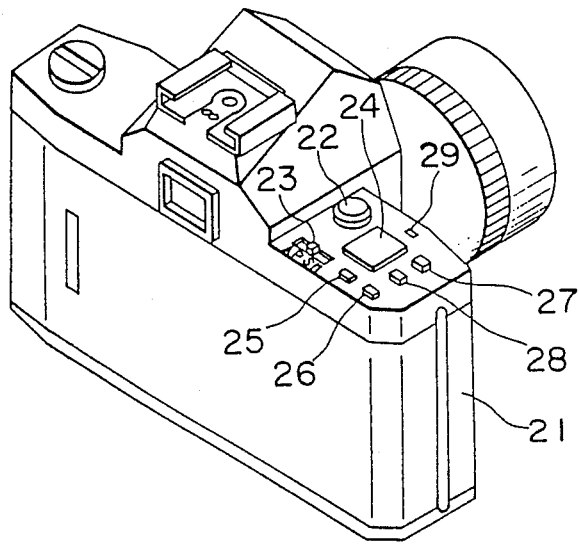
FIG. 2 is a perspective view of the camera of FIG. 1 as viewed from a different direction.

FIG. 2 illustrates the appearance of the camera body viewed from the rear. As shown, the camera body has a shutter release button 22, a mode selector slide 23, a liquid crystal display unit 24, an aperture setting button 25, an exposure time setting button 26, an up-shift button 27, a down-shift button 28 and a frame counter window 29 all arranged at convenient places readily accessible to and noticeable by the photographer. The shutter release button 22 when depressed is moveable in two stages between inoperative and operated positions past an intermediate position, and the first stage of movement from the inoperative position to the intermediate position results in the closure of a light measuring switch S1, shown in FIG. 3(a), to initiate the light measurement, the calculation and the display operation, but the subsequent second stage of movement from the intermediate position to the operated position results in the closure of a release switch S2, shown in FIG. 3(a), to initiate the exposure control if an exposure control mechanism has already been charged. The mode selector slide 23 is selectively movable to any one of the four click positions marked "A", "P", "S" and "M", respectively. When this mode selector slide 23 is in the A position, the camera is brought in position to operate under an aperture priority mode (hereinafter referred to as A mode) at which the exposure time is automatically controlled in reference to the preset aperture, but when the slide 23 is moved to the P position, the camera is brought in position to operate under a programmed mode (hereinafter referred to as P mode) at which a combination of the exposure time and the aperture are automatically controlled in dependence on the amount of light. It is to be noted that, during the P mode of operation, the program line varies dependent on the data fv fed from the lens assembly indicating the focal length, to which the zooming ring 3 has been adjusted, in such a way that, when fv>fvt, wherein fvt represents the data indicative of the focal length of, for example, 80 mm, a Pt mode is established in which a priority is given to the high shutter speed in determining the combination of aperture and exposure time, but when fvw>fv, wherein fvw represents the data indicative of the focal length of, for example, 35 mm, a Pw mode is established in which a priority is given to the small aperture in determining the combination of exposure time and aperture. However, when and so long as fvt>fv>fvw, a normal Pn mode is established. When the mode selector slide 23 is set at the S position, the camera is brought in position to operate under an exposure time priority mode at which the aperture is automatically controlled in reference to the preset exposure time, which mode is hereinafter referred to as S mode. On the other hand, when the slide 23 is in the M position, the camera is brought in position to operate under a manual mode at which both the exposure time and the aperture can be manually set according to the photographer's desire, which mode is hereinafter referred to as M mode.

Figure 3A:
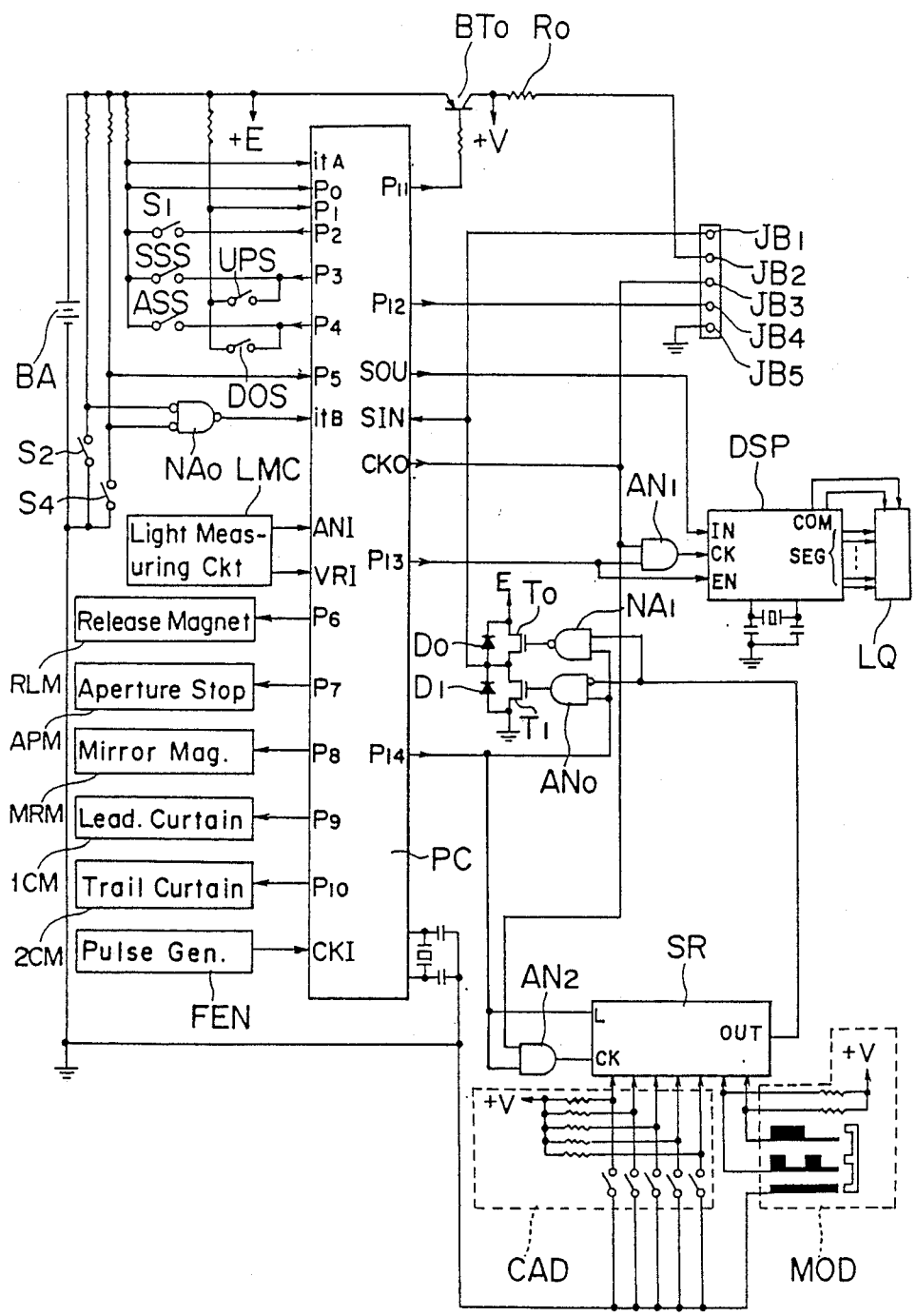
FIG. 3(*a*) is a circuit diagram showing an electric circuit incorporated in the camera body according to the present invention.
Figure 3B:
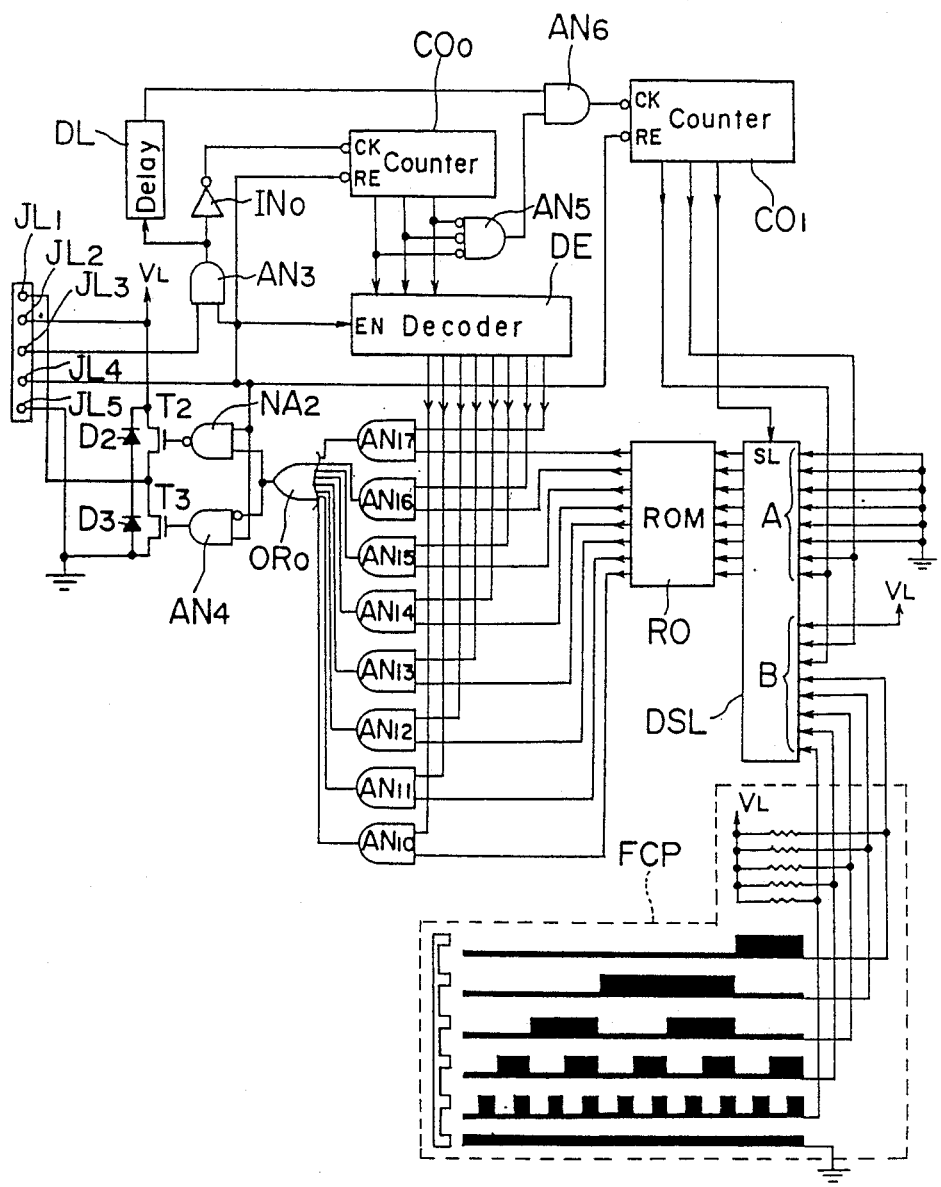

The aperture setting button 25 is adapted to be depressed at the time of setting of the aperture, and the depression of this button 25 results in the closure of a switch ASS, shown in FIG. 3(a), to initiate the light measurement, the calculation and the display operation and also to modify the aperture in dependence on the state of any one of the upshift and down-shift buttons 27 and 28. The exposure time setting button 26 is adapted to be depressed at the time of setting of the exposure time, and when this button 26 is depressed, a switch SSS shown in FIG. 3(a) is closed to initiate the light measurement, the calculation and the display operation and also to modify the aperture in dependence on the state of any one of the upshift and down-shift buttons 27 and 28. When the up-shift button 27 is depressed, a switch UPS shown in FIG. 3(a) is closed. When at this time the aperture setting button 25 is depressed while the camera is operable under any one of the A and M mode, the aperture size once set changes to a size smaller than it by 0.5 Ev. However, when at this time the exposure time setting button 26 is depressed while the camera is operable under any one of the S and M modes, the exposure time once set changes to a value shorter than it by 0.5 Ev. The repression of the down-shift button 28 results in the closure of a switch DOS shown in FIG. 3(a). When at this time the aperture setting button 25 is depressed while the camera is operable under any one of the A and M modes, the aperture size once set changes to a size larger than it by 0.5 Ev, but when at this time the exposure time setting button 26 is depressed while the camera is operable under any one of the S and M modes, the exposure time once set changes to a value longer than it by 0.5 Ev. The liquid crystal display unit 24 is used to display various pieces of information such as, for example, the ISO value, the combination of the exposure time and the aperture both used for the control, a camera wobbling warning, and the out-of coupling range warning. The frame counter window 24 is used to display the count of film frames exposed.

FIGS. 3(a) and 3(b) altogether illustrate an electric circuit of the camera system as a whole embodying the present invention, wherein FIG. 3(a) shows the circuit incorporated in the camera body while FIG. 3(b) shows the circuit incorporated in the lens assembly. The circuit incorporated in the camera body, which is hereinafter referred to as camera circuit in contrast to a lens circuit which is the circuit shown in FIG. 3(b) and incorporated in the interchangeable lens assembly, includes a source BA of electric power which may be constituted by one or more batteries. This power source BA feeds, through a power supply line +E, a microcomputer, a display circuit DSP, a shift register SR, AND gates AN0, AN1, AN2, and NAND gates NA0 and NA1. The camera circuit also includes the switch S1, which is a light measuring switch adapted to be closed upon the first stage of depression of the release button 22; the switch SSS which is a Tv switch adapted to be closed when the exposure time setting button 26 is depressed, the switch ASS which is an Av switch adapted to be closed when the aperture setting button 25 is depressed; the switch UPS which is an up-shift switch adapted to be closed when the up-shift button 27 is depressed; and the switch DOS which is a down-shift switch adapted to be closed when the down-shift button 28 is depressed.

A transistor BTo acts as a power supply transistor and is adapted to conduct, when the microcomputer PC initiates its operation, to supply an electric power from the power supply line +V to a light measuring circuit LMC, a release magnet circuit RLM, an aperture stop magnet circuit APM, a mirror magnet circuit MRM, a leading curtain magnet circuit 1CM, a trailing curtain magnet circuit 2CM, an aperture stop-down pulse generator FEN, an ISO data detecting circuit CAD, and an exposure control mode data generator MOD. Moreover, when and so long as the transistor BTo is in conduction, an electric power is supplied to the camera terminal JB2 through a protecting resistor Ro and then to a power line vL of the lens circuit of FIG. 3(b) through the lens terminal JL2 then connected with the camera terminal JB2. The protecting resistor Ro is used to avoid any possible shortcircuiting which may happen to occur between the power supply line +V and the ground when, for example, forceps touch the camera terminal JB2. It is to be noted that, except for the circuits LMC, RLM, APM, MRM, 1CM, 2CM and FEN, the camera circuit is fabricated in C-MOS.

Figure 6B:
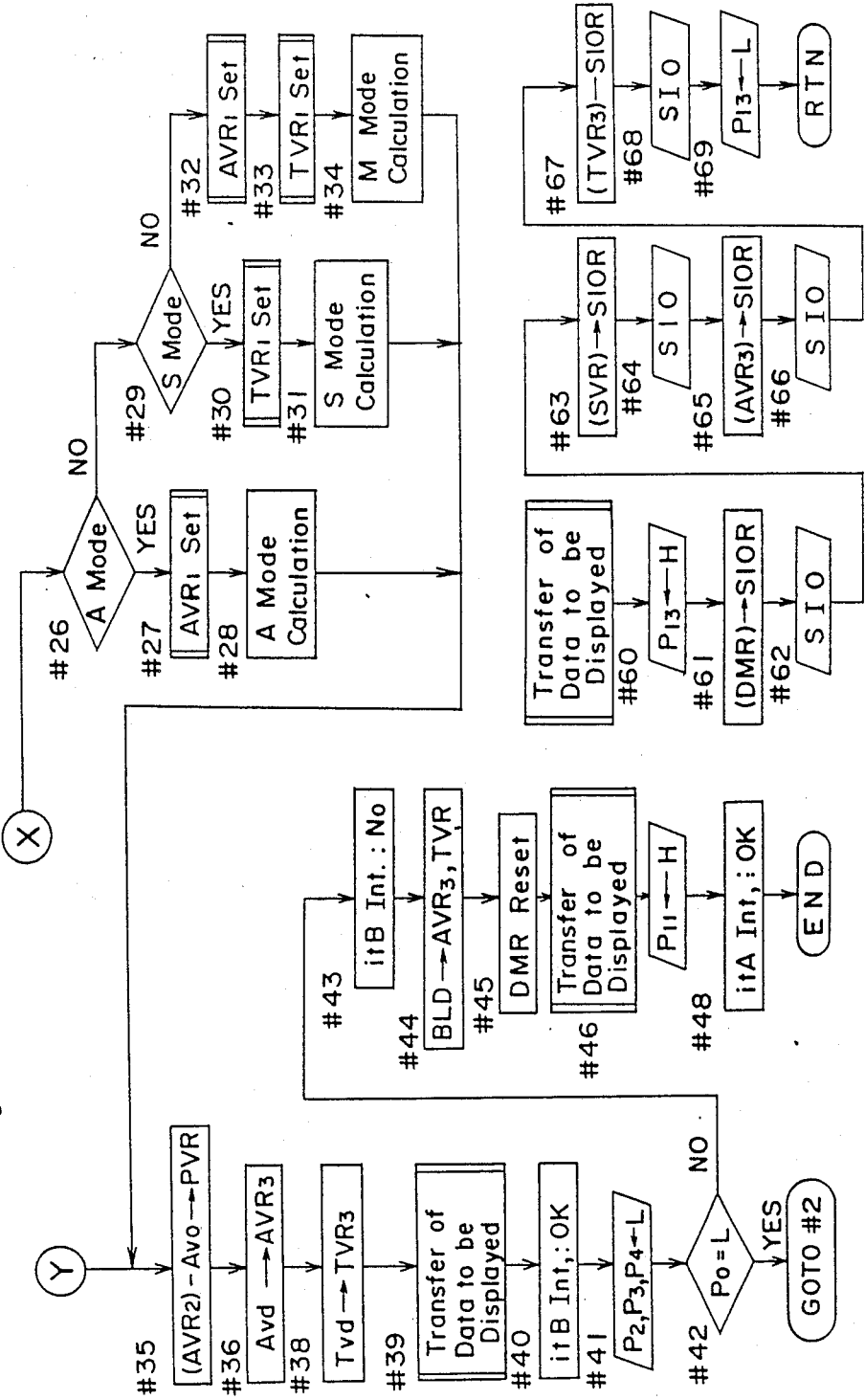
FIG. 6 comprises FIGS. 6(a) to 6(c) and altogether shows a flow chart of the sequence of operation of the camera system according to the present invention.
Figure 6C:
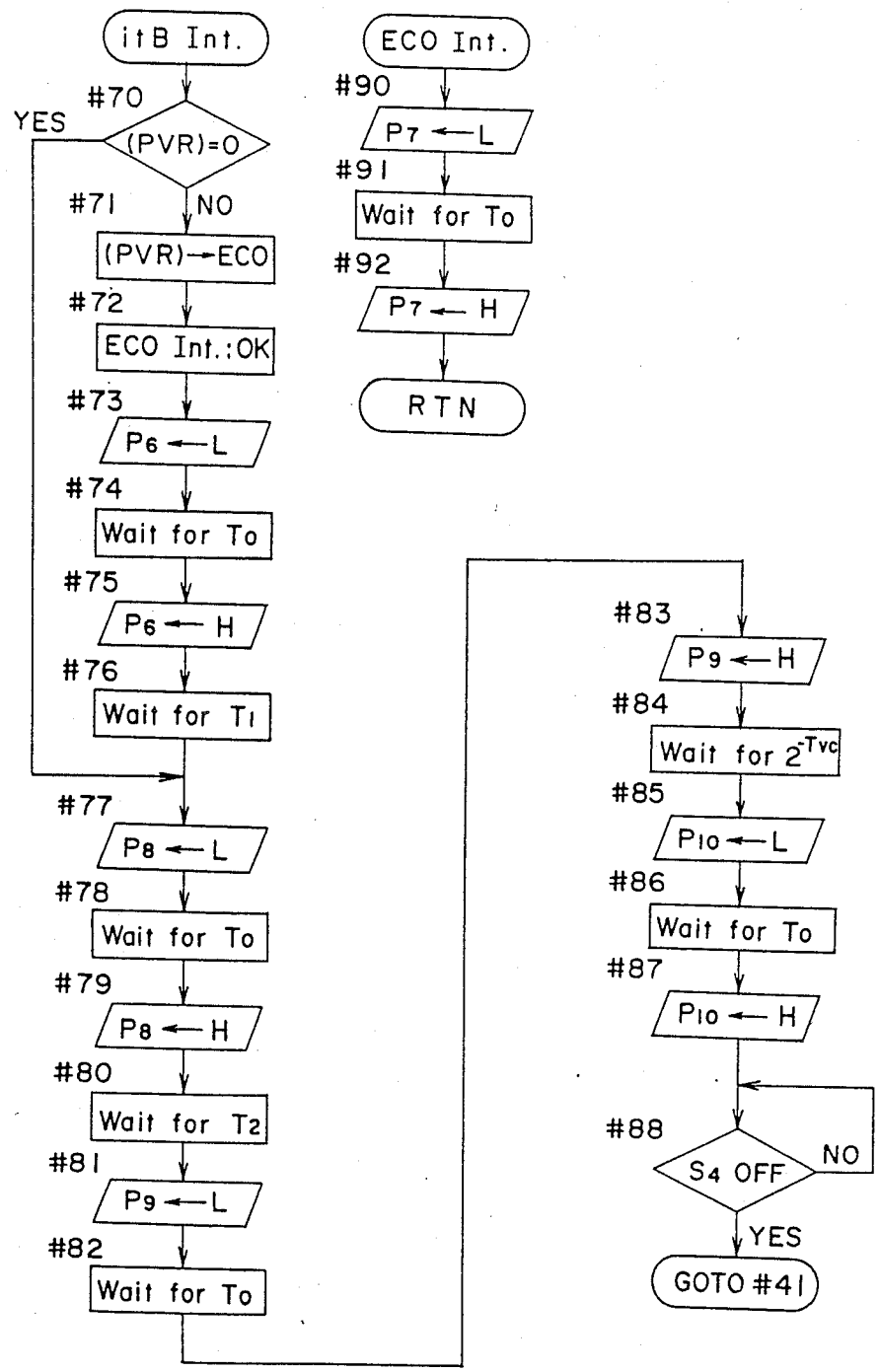
Figure 7:
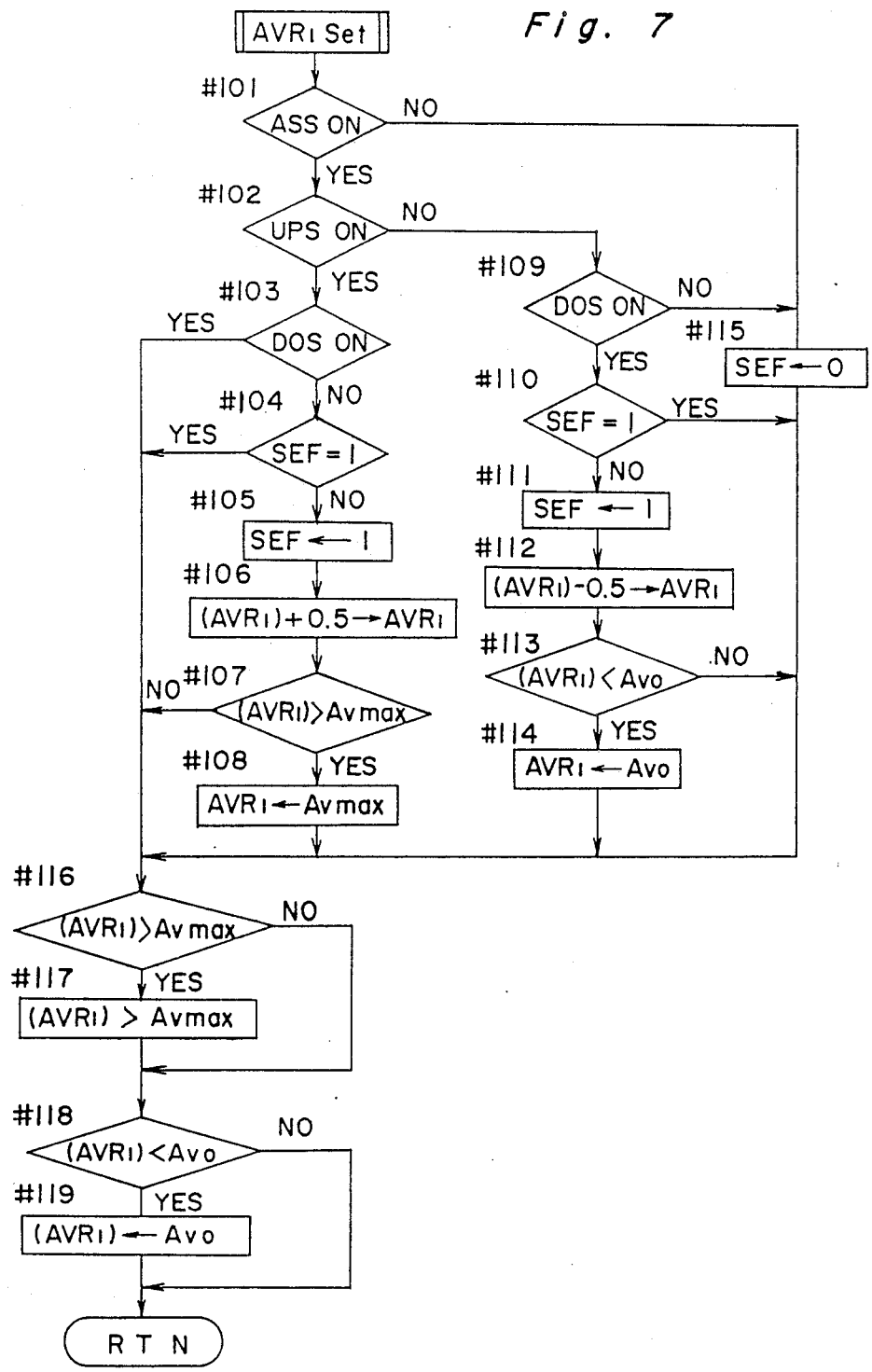
FIG. 7 is a flow chart showing a subroutine executed during the process flow of FIG. 6.

The operation of the camera system as a whole will now be described with reference to the flow charts of FIG. 6 and 7 showing the sequence of operation of the microcomputer PC. Assuming that the microcomputer PC is in the inoperative position, terminals P2, P3 and P4 are all in a low level state. When any one of the light measuring switch S1, the Tv switch SSS and the Av switch ASS is subsequently closed, an input to an interruption terminal itA sets down to a low level state and the microcomputer PC consequently starts its operation from the initial step #1. At step #1, a terminal P11 is rendered in a low level state wherefor the transistor BTo is caused to conduct to initiate the electric power supply from the power supply line +V and also the electric power supply through the resistor Ro. By rendering the terminals P2, P3 and P4 in a high level state, a terminal P14 is rendered in a high level state. When the terminal P14 is rendered in the high level state, ISO data and mode data are latched in the shift register SR in response to the positive edge of the high level signal emerging from the terminal P14. An ISO data output circuit CAD is a circuit operable to read a coded pattern indicative of the ISO data, which coded pattern is provided on a film container as is well known to those skilled in the art, whereas the mode data generator MOD is operable to generate the mode data from a coded pattern depending on the position of a slide member movable together with the mode selector slide 23 shown in FIG. 3(a). In addition, at the same time as the terminal P14 is rendered in the high level state, the NAND gate NA1 and the AND gates AN0 and AN2 are brought in position ready to be enabled. At step #4, the microcomputer PC undergoes a serial input and output operation with the consequence that eight clock pulses are output from a terminal CKO on the one hand and data fed to a data input terminal SIN are taken in a serial input/output register SIOR, provided internally of the microcomputer PC, in response to the negative edge of each positive edge of the eight clock pulses on the other hand. Substantially at the same time, the shift register SR sequentially outputs the data, which have been latched therein, on the basis of the eight clock pulses successively fed to the AND gates AN2. When the data so output are in the high level state, and output from both of the gates AN0 and NA1 is in a low level state and, accordingly, a field-effect transistor To is brought in a conductive state thereby permitting a high level signal to be fed to the data input terminal SIN. On the other hand, when the data outputed from the shift register SR are in the low level state, an output from both of the gates AN0 and NA1 is in a high level state and, accordingly, a field-effect transistor T1 is brought in a conductive state thereby permitting a low level signal to be fed to the data input terminal SIN. It is to be noted that, when and so long as the terminal P14 of the microcomputer PC is in a low level state, the NAND gate NA1 and the AND gate AN0 generate high and low level signals, respectively, and therefore both of the field-effect transistors T0 and T1 are held in a non-conducting state, thereby avoiding any possible adverse influence which would otherwise occur when data taken from the lens circuit of FIG. 3(b) are fed to the data input terminal SIN. Upon termination of step #4, of the data taken in the serial input/output register SIOR, the mode data are set in a register MOR, and the ISO data are, after having converted the data taken in into data for the calculation, set in a register SVR. Then, the microcomputer PC renders the terminal P14 in a lower level state and proceeds to step #7.

At step #7, a decision is made as to whether or not data appropriate to the law of the coded pattern on the film container have been read out from the ISO data taken in the serial input/output register SIOR. If it proves that the data appropriate to the law of the coded pattern have been read out, the contents of the register SVR remain unchanged, but if it proves to the contrary, it can note that the film container having no coded pattern is loaded or any film container is not loaded and, in such case, data representative of the ISO sensitivity which is most often utilized, for example, ISO 100, can be set in the register SVR.

Subsequently, the microcomputer PC proceeds to the reading of data out from the lens circuit shown in FIG. 3(b). In the first place, the content of a register k is rendered "0" and a terminal P12 is rendered in a high level state. The register k serves to select one of the data setting registers LDR0 to LDR5 according to the content stored therein More specifically, when the content of the register k is "0", "1", "2", "3", "4" or "5", the register LDR0, LDR1, LDR2, LDR3, LDR4 or LDR5, can be selected, respectively. When the terminal P12 is rendered in the high level state as hereinabove described, this high level signal is fed to the lens circuit through the terminal JB4 and then the terminal JL4. By this high level signal, all of the AND gates AN3 and AN4, the NAND gate NA2 and a decoder DE are brought in position ready to be enabled and, on the other hand, counters C00 and C01 are released from their reset states. Then, the microcomputer undergoes the serial input and output operation to sequentially read in the data, which are fed to the data input terminal SIN from the lens circuit through the coupled terminals JL1 and JB1, in response to the negative edge of the same clock signal as the clock signal outputed from the clock output terminal CKO, the data so read in being subsequently set in a register LDRK to add "1" to the register k. Then, a decision is made as to whether or not the content of the register k has become "6". If the content of the register k is determined "6", the process flow proceeds to step #15, but if it is not, the process flow proceeds to step #11 to read in the next succeeding data fed from the lens circuit. By repeating the above described process flow, six types of data can be read in the microcomputer PC and set in the register LDR0 to LDR5, respectively.

Referring to FIG. 3(b) showing the lens circuit, that is, the circuit built in the interchangeable lens assembly, a counter C00 is a 3-bit counter operable to count the number of negative edges of the respective clock pulses which have been fed from the clock output terminal through the coupled terminals JB3 and JL3 and then the AND gate AN3 and subsequently inverted by an inverter IN0, that is, the number of positive edges of the respective clock pulses outputed from the clock output terminal CKO. The decoder DE sequentially generates a high level signal from its left-hand terminal to its right-hand terminal in correspondence with an output from the counter C00, thereby bringing AND gates AN10 to AN17 in position ready to be enabled. Accordingly, each of the AND gates is held in position ready to be enabled during a period from the positive edge of one clock pulse to the positive edge of the next succeeding clock pulse, thereby generating one-bit data. On the other hand, when the outputs from the counter C00 are all rendered in a low level state upon completion of its counting operation up to eight clock pulses and an AND data AN5, therefore generates a high level output, a counter C01 receives the clock pulses, which have been outputed from an AND gate AN3 and subsequently delayed by a delay circuit DL, and counts the number of negative edges of the clock pulses so received thereby. The delay circuit DL is utilized to inhibit the AND gate AN6 from outputing a pulse in response to the positive edge of the first clock pulse. Accordingly, each time the eight clock pulses are fed thereto, one clock pulse is counted. Reference character DSL represents a data selector adapted to output the input data, which have been fed to an input section A, when and so long as the most significant bit of the counter C01 is in a low level state, but to output the input data, which have been fed to an input section B, when and so long as it is in a high level state. And, RO fixedly stores various data of the interchangeable lens assembly at respective addresses. When one of the addresses is specified by address data fed from the data selector, the data stored and fixed at such specified address are outputed and are then output through the AND gates AN10 to AN17 bit to bit from the least significant bit. The data output from the AND gates AN10 to AN17 emerges from an OR gate OR0 and, when and so long as the output from the OR gate OR0 is in a high level state, a field-effect transistor T2 is rendered conductive with the high level signal consequently fed to the data input terminal SIN through the coupled terminals JL1 and JB1. However, when and so long as the output from the OR gate OR0 is in a low level state, a field-effect transistor T3 is rendered conductive with the low level signal consequently fed to the data input terminal SIN through the coupled terminals JL1 and JB1.

Figure 4:
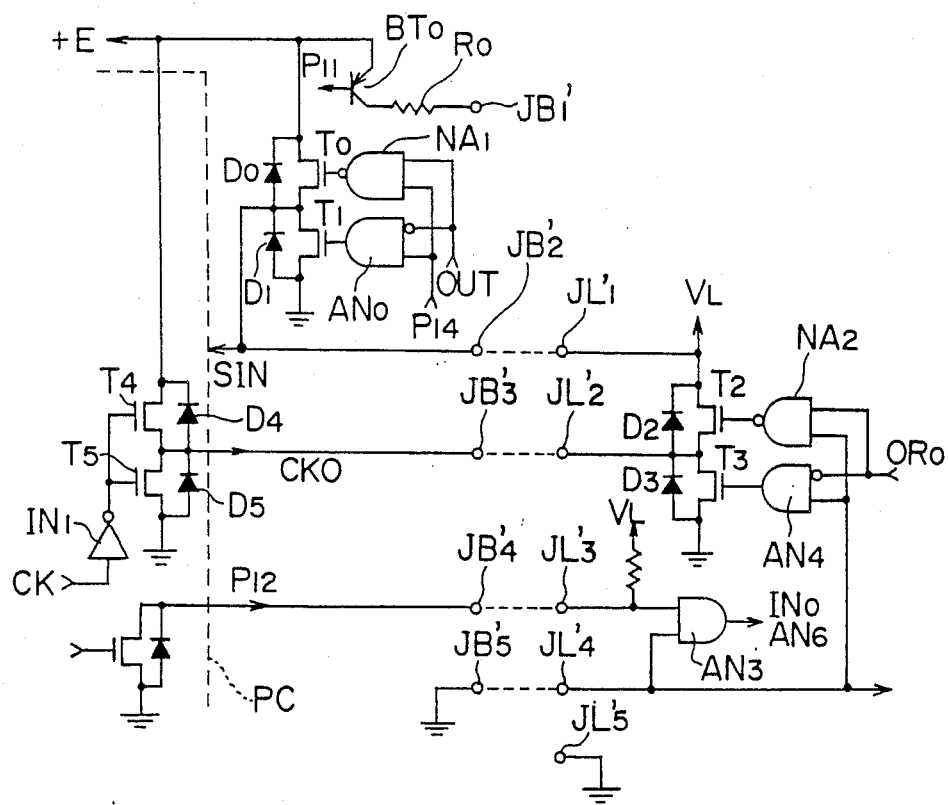
FIG. 4 is a circuit diagram showing an essential portion of a circuit shown for the purpose of comparison with the operation of the embodiment in FIGS. 3(a) and 3(b) according to the present invention.
Figure 5:
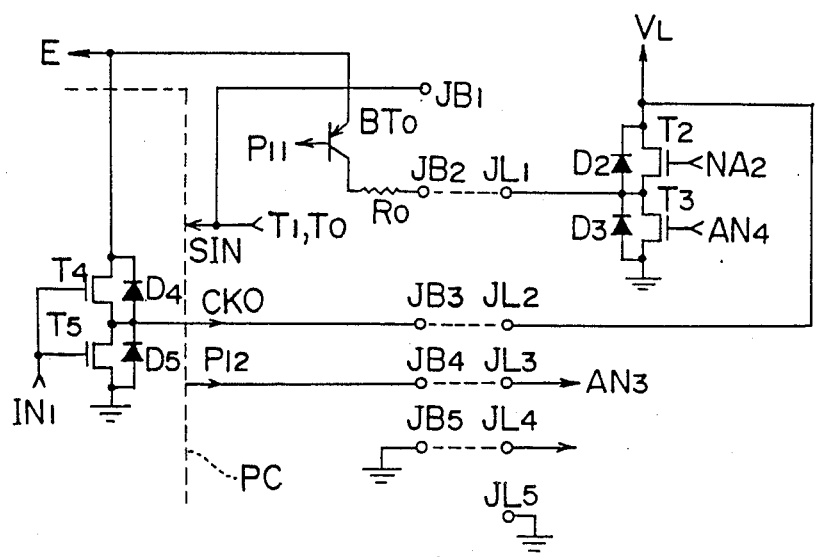
FIG. 5 is a circuit diagram showing an essential portion of the embodiment in FIGS. 3(a) and 3(b) according to the present invention, shown for the purpose of comparison with the circuit of FIG. 4.

Hereinafter, the reason will be discussed that, even if the lens assembly is incompletely coupled to the camera body, the transmission of various data between the lens assembly and the camera body will not be adversely affected. For this purpose, reference will now be made to FIGS. 4 and 5. It is to be noted that FIG. 4 illustrates the case employed only for the purpose of comparison, in which the power terminal on each of the camera body and the interchangeable lens assembly is positioned at one extremity of the arcuate row of the terminals and the lens assembly is incompletely coupled to the camera body. FIG. 5 illustrates the case in which the lens assembly incorporating the lens circuit of FIG. 3(b) is incompletely coupled to the camera body incorporating the camera circuit of FIG. 3(a).

Referring first to FIG. 4, the lens assembly is incorrectly coupled to the camera body such that a data terminal JB2' and a clock terminal JB3', both on the camera body, are electrically connected with a power terminal JL1' and a data terminal JL2' both on the lens assembly, respectively. At the outset, a discussion will be made as to what will happen when, in the incomplete condition, the clock pulses are generated from the clock terminal CKO to permit data from other data output sections, that is, the shift register SR, provided internally of the camera body, to be read in the data input terminal SIN. A high level signal of the clock is generated upon the conduction of a field-effect transistor T4. Then, a voltage from the power supply line +V is supplied through the field-effect transistor T4 and the coupled terminals JB3' and JL2' to the lens assembly and then to a power supply line VL in the lens assembly through a diode D2 which is essentially formed by a CMOS circuit. This signal is in turn fed to the data input terminal SIN in the camera body through the coupled terminals JL1' and JB2'. At this time, it is assumed that the data from the shift register SR in the camera body are in the low level state, an N-channel field-effect transistor T1 is conducting and the low level signal is to be read in the data input terminal SIN. However, when and so long as the field-effect transistor T1 is conducting, the potential at the data input terminal SIN is equal to the potential of the electric power +E divided by the on-resistance of a field-effect transistor T4, and the on-resistance of both the diode D2 and the field-effect transistor T1 and is not clear as to whether it becomes a high level state or whether it becomes a low level state. Accordingly, there is a possibility that incorrect data will be read in the data input terminal SIN. (It may be contemplated to employ a resistor of relatively high resistance between the terminal JB2' and the data input terminal SIN or between the clock output terminal CKO and the terminal JB3' to avoid the reading of the incorrect data. However, where such a resistor is employed, it may happen that a low-pass filter having a large time constant will be formed by the above described resistor and the parasitic capacitance of the data transfer line or the clock transfer line, in which case a high speed data transmission will be hampered.) On the contrary thereto, in the embodiment according to the present invention, since the data terminal JL1 for transmitting the data from the lens assembly to the camera body is positioned on the leading extremity of the row of the lens terminals with respect to the direction of turn of the lens assembly which is effected when the lens assembly is coupled to the camera body, even if any erroneous connection between the terminals such as corresponding to that described with reference to and shown in FIG. 4, no voltage will be imposed on the data terminal JB1 on the camera body as shown in FIG. 5 and, therefore, no adverse effect will occur when the data input terminal SIN in the camera body reads in the output from the shift register SR. In general, in the case of the embodiment according to the present invention, the terminal JB1 for receiving the data of the camera is electrically connected with the terminal JL1 only when and after the interchangeable lens assembly has been completely coupled to the camera body and hence held in the locked position, and will not be connected to any one of the other terminals JL2 to JL5 during the mounting of the lens assembly. Accordingly, even if while the lens assembly is incompletely coupled to the camera body the ISO data are read in through the data input terminal SIN, there is no factor that adversely affect the data and the ISO data are, therefore, correctly read in by the microcomputer PC. It is to be noted that, in the case of the embodiment according to the present invention, although a current tends to flow in through the transistor BTo, the resistor Ro, the coupled terminals JB2 and JL1, the diode D2, a power source VL and the coupled terminals JL2 and JB3, the waveform of the clock signal will not be adversely affected because the impedance is increased by the protecting resistor Ro.

The relationship between the data stored and fixed in a read-only memory RO and the addresses of the read-only memory RO as well as the operation necessary to specify the addresses will now be described.

TABLE 1

| Counter (CO1) | Addresses | Data | Registers |
| --- | --- | --- | --- |
| 000 | 000 00000 | Check data | LDR0 |
| 001 | 000 00001 | AVo: Full Open Aperture Size | LDR1 |
| 010 | 000 00010 | Avmax: Minimum Aperture Size (maximum F-number) | LDR2 |
| 011 | 000 00011 | Wv: Error in Full Open Aperture Metering | LDR3 |
| 100 | 100 ***** | Avz: Deviation in Effective Aperture Size from A Standard | LDR4 |
| 101 | 101 ***** | fv: Focal Length | LDR5 |

Table 1 illustrates the relationship among the output from the counter CO1, the address of the read-only memory RO to be specified, the data stored at the specified address, and the register to which the data are set within the microcomputer PC. Each time the eight clock pulses are fed to the counter CO1, the latter increases its count by one increment. Accordingly, at the outset, the output from the counter CO1 is "000". As a result, the data, "000 00000", from an input section A are outputed from the data selector DSL to the read-only memory RO. Subsequently, check data (for example, "10101010") common to all of the available interchangeable lens assemblies is transferred from the read only memory RO to the camera body. When the output from the counter CO1 subsequently become "001", an address data "000 00001" from the input section A is outputed from the data selector DSL and a data Avo representative of the full open aperture size is outputed from the read-only memory RO. In the case of the zoom lens assembly having its effective aperture variable with change in focal length, a data representative of the full open aperture size at the shortest focal length, that is, the greatest aperture size available in the lens system, is outputed. When the output from the counter CO1 becomes "010", an address data "000000010" from the input section A is output from the data selector DSL and a data Avmax representative of the minimum aperture size (the maximum f-stop number) is output from the read-only memory RO. Also, as for this minimum aperture size, in the case of the zoom lens assembly having its effective aperture variable with change in focal length, a data representative of the minimum aperture size at the shortest focal length is outputed. When the output from the counter CO1 becomes "011", an address data "00000011" is output from the data selector DSL and a data Wv representative of an error in full open aperture metering is output. When the output from the counter CO1 becomes "100", an address data "100***" from the input section B is output from the data selector DSL. The five-bit data represented by "*" is a data output from the focal length code plate FCP in correspondence with the focal length set by the zooming ring 1. At this address, a data representative of the deviation in effective aperture size from that at the shortest focal length is fixedly stored. It is, however, to be noted that, in the case of a zoom lens assembly having its effective aperture not variable with change in focal length, a data "00000000" is fixedly stored. In addition, in the case of a lens assembly of a fixed focal length, no focal length code plate is employed and, at the same time, no data selector DSL is employed, and the address in the read-only memory RO is specified "00000100" and, therefore, a data "00000000" is output from the read-only memory RO. When the output from the counter CO1 become "101" a data "101***" from the input section B is output from the data selector DSL and a data fv corresponding to the focal length set by the zooming ring 1 is output. In the case of the lens assembly of a fixed focal length, the address of "00000101" is specified and a data fv representative of the fixed focal length is output.

Referring to the flow chart of FIG. 6, the operation of the microcomputer PC will now be described. After the data has been taken in from the lens circuit, the analog-to-digital conversion of an output from the light measuring circuit LMC is carried out at step #15. The output from the light measuring circuit LMC is fed to an analog input terminal ANI so that a reference voltage created within the light measuring circuit LMC can be utilized as a reference voltage for a digital-to-analog converter built in the microcomputer PC for the analog-to-digital conversion and the output from the light measuring circuit LMC is subjected to the analog-to-digital conversion on the basis of this reference voltage. Subsequently, at steps #16 and #17, both the full open aperture size and the minimum aperture size at the focal length once set are calculated, the resultant data being designated by Avo and Avmax, respectively. Then, at step #18, the error Wv, included in the data of the output from the light measuring circuit LMC which has been subjected to the analog-to-digital conversion, and a factor of the full open aperture size Avo are subtracted on the basis of the data read out from the lens assembly to calculate Bv to which the film sensitivity data set in a register SVR is added to calculate an exposure value EV.

Upon the completion of the above described operation, an exposure calculation operation starting from step #20 starts. At step #20, based on the data taken in a register MOR, a decision is made as to whether or not it is the P mode. If it is the P mode, the program flow proceeds to step #21 at which a decision is made as to whether or not the focal length data fv from the lens assembly is greater than fvt. If fv>fvt, the programmed calculation for the high speed shutter priority is performed at step #21 which is followed by step #35. However, if the determination at step #21 shows fv≦fvt, a decision is made at step #23 to find if fv<fvw. If fv≦fvw, the program flow proceeds to step #25 at which the programmed calculation for the small aperture priority is performed, which step #25 is subsequently followed by step #35. When the determination at step #23 shows fv≧fvw, the normal programmed calculation is performed at step #24 which is followed by step #35. On the other hand, if the determination at step #20 is such that it is not the P mode, a decision is made at step #26 to find if it is the A mode. If it is the A mode, the aperture is set in a register AVR1 depending on the states of the respective buttons 25, 27 and 28, and at subsequent step #26, the calculation for the A mode is performed, followed by step #35. If it is not the A mode as determined at step #26, a decision is performed at step #29 to determine if it is the S mode. If it is the S mode, an exposure time is set in a register TVR1 at step #30 in dependence on the states of the respective buttons 26, 27 and 28 and, after the calculation for the S mode has been performed at step #31, the program flow proceeds to step #35. If it is not the S mode as determined at step #29, this means the M mode and, therefore, at step #32, the aperture determined in dependence on the states of the respective buttons 25, 27 and 28, and the exposure time determined in dependence on the states of the respective buttons 26, 27 and 28 are set in registers AVR1 and TVR1, respectively, at step #32 which is followed by step #34 at which the calculation for the M mode is performed, the program flow thereafter proceeding to step #35.

The aperture for the control obtained from one of the above described calculations for the respective modes is set in a register AVR2 while the exposure time for the control obtained from one of the above described calculations for the respective modes is set in a register TVR2. Moreover, an over exposure warning, an under exposure warning, a camera wobbling warning and the data of the displacement from a proper exposure during the M mode are all set in a register DMR. The preset aperture and exposure time are set in the registers AVR1 and TVR1. If during the calculation for the S mode the calculated aperture AV is such that Av°Avmax, Avmax and the data on the preset exposure time are set in the registers AVR2 and TVR2, respectively, with the over exposure warning effected. On the other hand, if Av°Avo, Avo and the data on the preset exposure time are set in the registers AVR2 and TVR2, respectively, with the under exposure warning effected. During the P mode, if Avmax+Tvmax°Ev, Avmax and Tvmax are set in the registers AVR2 and TVR2, respectively, with the over exposure warning effected. Moreover, if the calculated Av is smaller than Avo, Avo is set in the register AVR2 and, if Tv which is obtained by Ev-Avo=Tv is higher than Tvmin, the Tv so obtained is set in the register TVR2, but if Tv<Tvmin, Tvmin is set in the register TVR2 with the under exposure warning effected. At step #35, the number of steps to be stopped-down is calculated from both the data on the aperture size for the control and the data on the full open aperture size, the calculated data beings et in a register PVR. At the subsequent step #36, data Avd on the aperture for the display, of which minimum unit is 0.5 Ev, is calculated from the data on the aperture for the control and is then set in a register AVR3. At step #38, data Tvd on the exposure time for the display, of which minimum unit is 0.5 Ev, is calculated from the data on the exposure time for the control and is then set in a register TVR3. After the above described operation has been completed, the program flow proceeds to step #39 at which a subroutine for the transfer of the data to be displayed is executed.

The subroutine for the transfer of the data to be displayed will now be described. At step #60, a terminal P13 is rendered in a high level state, the AND gate AN1 is brought in position ready to be enabled, and the display circuit DSP is set in position ready to receive inputs. The content of the register DMR is set in a serial input/output register SIOR and the serial input and output operation is performed. Thereby, the content of the register DMR is taken in the display circuit DSP. Subsequently, the content (ISO data) of the register SVR is set in the register SIOR and the serial input and output operation is performed. After the data in the register AVR3 on the aperture for the display and the data in the register TVR3 on the exposure time for the display have been fed to the display circuit DSP, the terminal P13 is rendered in a low level state, followed by the return to the main routine. Then, the display circuit DSP outputs a signal, corresponding to the data so read out, to a segment terminal SEG and a display corresponding to the data fed together with a signal from a common terminal COM is carried out by means of a liquid crystal display unit LQ.

After the completion of the transfer of the data to be displayed, and at step #40, interruption to a terminal itB is enabled. This is such that, if the release switch S2 shown in FIG. 3 is closed and, at the same time, the exposure control mechanism has been charged with the switch S4 consequently closed, the output from the NAND gate NA0 changes to a low level state with an interruption signal consequently fed to the terminal itB, and the microcomputer performs an exposure control operation from step #70 if the interruption to the terminal itB is in condition ready to be enabled, no matter what operation it has performed. When the interruption to the terminal itB is enabled, the terminals P2, P3 and P4 are rendered in a low level state and a decision is made as to whether or not an input terminal P0 is rendered in a low level state as a result of at least one of the switches S1, SSS and ASS having been closed. If the terminal P0 is rendered in the low level state, the program flow returns to step #2, thereby repeating the above described operation. On the other hand, if the terminal P0 is in the high level state, the program flow proceeds to step #43 at which the interruption to the terminal itB is disabled and a blank data BLD for turning off the display is set in the registers AVR3 and TVR3 and, further, the register DMR in which display data such as for warning is set is reset, followed by the subroutine for the transfer of the data to be displayed. After the completion of the data transfer starting from step #60 in the manner as hereinbefore described, the terminal PlI is rendered in a high level state to interrupt the power supply by means of the transistor BTo while the interruption to a terminal itA is enabled to interrupt the operation of the microcomputer PC. Accordingly, at the time of interruption of the operation of the microcomputer, the display unit LQ merely displays only the ISO data.

Hereinafter, a subroutine for the aperture setting will be described with reference to FIG. 7. At step #101, a decision is made to find if the switch ASS is closed. This is to determine if, while a terminal P4 is rendered in a low level state, the terminal P0 is rendered in a low level state and to render the terminal P4 in a high level state. If the switch ASS is not closed, a flag SEF is set to "0" at step #115 followed by step #116. On the other hand, if the switch ASS is closed, a decision is made at step #102 as to whether or not the switch UPS is closed. This operation is to determine if, while the terminal P3 is rendered in a low level state, the terminal P1 is rendered in a low level state and to render the terminal P3 in a high level state. If the switch UPS is closed, a decision is made at step #103 as to whether or not the down-shift switch DOS is closed. This operation is to determine if, while the terminal P4 is rendered in a low level state, the terminal P1 is in a low level state and to render the terminal P4 in a high level state. If the down-switch DOS is, too, closed, it means that the up shift button 27 and the down-shift button 28 are simultaneously depressed and, therefore, the program flow proceeds to step #116 with no set value altered. If it proves at step #103 that the switch DOS is not closed, a decision is made at step #104 to find if the flag SEF is "1". If the flag SEF has been found to be "1", this means that the up-shift button 27 is kept depressed and, therefore, the program flow proceeds to step #116. On the other hand, if the flag SEF has been found to be "0", this means that the up-shift button 27 is first depressed and, therefore, the flag SEF is set to "1" at the subsequent step #105 followed by step #106 at which 0.5 is added to the content of the register AVR1. At step #107, the minimum aperture size Avmax obtained at step #17 is compared with the content of the register AVR1. If (AVR1)° Avmax, Avmax is set in the register AVR1 at step #108 followed by step #116. On the other hand, if (AVR1)≦Avmax, the data of the register AVR1 remains unchanged and the program flow proceeds to step #116.

If the determination at step #102 is such that the switch UPS is not closed, step #102 is followed by step #109 at which a decision is made to find if the switch DOS is closed. If the switch DOS is not closed, too, the flag SEF is set to "0" at step #115 followed by step #116. On the other hand, if the switch DOS is closed, a decision is made at step #110 to find if the flag SEF is set to "1". If the result at step #110 indicates that the flag SEF is "1⇌, this means that the down-shift button 28 is kept depressed and, therefore, the program flow proceeds to step #116 without the data being altered. On the other hand, if the result at step #110 indicates that the flag SEF is "0", this means that the down-shift button 28 is first depressed and, at this time, the flag SEF is set to "1" at step #111 followed by step #112 at which 0.5 is subtracted from the content of the register AVR1. If the result of comparison carried out at the step between the content of the register AVR1 and the data Avo of the full open aperture size obtained at step #16 shows (AVR1)≧Avo, the content of the register AVR1 remains unchanged and the program flow proceeds to step #116. On the other hand, if it shows (AVR-1)<Avo, the full open aperture size Avo is set in the register AVR1 at step #114, followed by step #116.

At step #116, a decision is made as to whether or not the content of the register AVR1 is greater than the value representative of the minimum aperture size Avmax, and if it not greater than Avmax, the content of the register AVR1 remains unchanged, but if it is greater than Avmax, the minimum aperture size Avmax is set in the register AVR1 at step #117 in place of the original content in the register AVR1. At step #118, a decision is made as to whether the content of the register AVR1 is smaller than the value representative of fuller open aperture size Avo determined at step #16. If the result of comparison at step #118 indicates that the content of the register AVR1 is smaller than Avo, Avo is set in the register AVR1 at step #119 in place of the original contents in the register AVR1, but if it shows the content of the register AVR1 not smaller than Avo, the content of the register AVR1 remains unchanged and the program flow subsequently returns to the main routine. The program flow from step #116 to step #119 is provided for the purpose of avoiding any possible departure of the data, set in the register AVR1 prior to the lens assembly being interchanged, from a controllable range when the lens assembly is interchanged. In addition, as shown in the subroutine, a single depression of any one of the up-shift and down-shift buttons results in the change of the set value by 0.5 Ev.

The subroutine for the determination of the exposure time is similar to the subroutine shown in FIG. 7 except that step #101 is substituted by a decision step to determined if the switch SSS is closed; the register AVR1 at each of the steps #106, 107, 108, 112, 113 and 114 is substituted by the register TVR1; Avmax is substituted by the data Tvmax on the shortest exposure time; Avo is substituted by the data Tvmin on the longest exposure time; and steps #116 to #119 are omitted because of no change occurring in any one of the shortest and longest exposure times.

Referring to FIG. 6, particularly to FIG. 6(c), the operation which takes place when an interruption signal is fed to the interruption terminal itB will now be described. At step #60, a decision is made as to whether or not the data of a register PVR associated with the number of f-stop steps to be stopped down is "0". If it is not "0", the content of the register PVR is set in an event counter ECO to enable the interruption by the event counter ECO. And, a low level pulse of a duration To is generated from a terminal P6 to activate the release magnet circuit RLM. Then, the engagement of the control lever 15 shown in FIG. 1 is released and the control lever 15 starts its movement in the direction X to initiate the aperture stop-down operation. In addition, in response to the movement of the control lever 15, the pulse generator FEN generates a pulse which is in turn fed to a clock input terminal of the microcomputer PC at which, in response to each pulse, the data of the number of f-stop steps to be stopped down, which is preset in the event counter ECO, is subtracted. The microcomputer, after the lapse of a time T1 subsequent to the generation of a low level pulse from the terminal P6, generates from a terminal P8 a pulse of a duration To necessary to activate the mirror magnet circuit MRM. When the mirror magnet circuit MRM is so activated, the engagement of the reflective mirror 17 shown in FIG. 1 is released and the reflective mirror 17 is therefore is pivoted upwards. After the lapse of a time T2 subsequent to the generation of the low level pulse from the terminal P8, the program flow proceeds to step #81 at which a low level pulse of a duration To is generated from a terminal P9. During a period from the generation of the low level pulse from the terminal to step #81, the aperture spends time enough to allow it to be stopped down from the full open aperture size to the minimum aperture size regardless of the type of an interchangeable lens assembly, and during this time pulses equal in number to the number of f-stop steps to be stopped down are generated from the encoder FEN and the content of the event counter ECO is zeroed. By this operation, the interruption by the event counter ECO is effected and the operation starting from step #90 is initiated. In this program flow, a low level pulse of a duration To is generated from a terminal P7, thereby returning to the main routine. In this way, the aperture stop magnet circuit APM is activated to stop the movement of the control lever 15 so that the aperture can be controlled to a preset aperture. When a time T2 elapses subsequent to the generation of the low level pulse from the terminal P8, the upward pivotal movement of the mirror 17 has completed, and a low level pulse is generated from the terminal P9 to initiate the travel of the leading curtain.

Upon the initiation of the travel of the leading curtain incident to the generation of the low level pulse from the terminal P9, a time 2−Tvc based on the data Tvc of the exposure time for the control, set in a register TvR2, is counted, and upon the completion of the counting of this time, a low level pulse is generated from a terminal P10 to activate the trailing curtain magnet circuit 2CM so that the travel of the trailing curtain can be initiated. After the completion of the travel of the trailing curtain, and the subsequent closure of a switch S4, the program flow proceeds to step #41 with the subsequent operation taking place in a manner similar to that hereinbefore described.

As hereinbefore fully described, according to the present invention, except for the aperture stop-down quantity transmission means essentially required to control the aperture mechanism of the interchangeable lens assembly from the side of the camera body, neither the aperture adjusting ring in the interchangeable lens assembly nor mechanical component parts such as mechanical linkage members associated with the aperture between the interchangeable lens assembly and the camera body are employed. Therefore, not only can the number of component parts of one or both of the lens assembly and the camera body be minimized, but also they can have enough space to spare. In addition, in these component parts, neither the machining precision nor the accurate positioning, which have hitherto been considered important problems, need be required to be taken into consideration. Furthermore, although information to be transmitted between the interchangeable lens assembly and the camera body includes information in the error in full aperture metering, and, in the case of the zoom lens assembly, the focal length, changes in aperture resulting from the zooming as the case may be, and the like, if these pieces of information are stored in the read-only memory in a manner similar to information of the full open aperture size and the minimum aperture size, the construction of the present invention can be concurrently utilized to transmit these pieces of information between the lens assembly and the camera body. Yet, while in the case of the customary interchangeable lens assembly having an aperture adjusting ring and an aperture mechanism mechanically associated therewith, a manipulation to set the aperture adjusting ring to a particular position to prevent a mechanical control by the aperture adjusting ring from interfering with this is required even though the aperture is set on the side of the camera body, such complicated procedures are not required according to the present invention. What is more, according to the present invention, any possible confusion which would occur in transmitting electric signals between the lens assembly and the camera body in the event of the incorrect coupling therebetween can advantageously be eliminated.

Although the present invention has fully been described in connection with the preferred embodiment thereof with reference to the accompanying drawings, it is to be noted that various changes and modifications are apparent to those skilled in the art. Such changes and modifications are to be understood as included within the true scope of the present invention as defined by the appended claims unless they depart therefrom.

We claim:

1. In a camera system capable of selectively functioning in a manual exposure control mode or an automatic exposure control mode having a camera body and an interchangeable objective lens removably coupled with the camera body, the improvement which comprises:

means, located in the interchangeable objective lens, for adjusting the aperture size of the lens without any source of manually controlling the adjusting means within the interchangeable objective lens;

a common electric terminal for data transmission from the interchangeable objective lens to the camera body;

means, located in the interchangeable objective lens, for transmitting a first electric data representative of the fully open aperture size and a second electric data representative of the minimum available aperture size peculiar to the objective lens, through said common electric terminal to the camera body;

means, located in the camera body, for manually setting exposure time including means for retaining the manually set exposure time regardless of a selection between the manual and automatic exposure control modes;

means, located in the camera body, for manually setting aperture including means for retaining the manually set aperture regardless of a selection between the manual and automatic exposure control modes;

means, located in the camera body, for restricting the manual aperture value setting within an aperture value range defined between the first and second electric data transmitted from the interchangeable objective lens;

means, located in the camera body, for performing a calculation for the manual exposure control mode in response to said manual exposure time setting means and said manual aperture value setting means;

a shutter means located in the camera body;

first means, located in the camera body, for controlling said shutter means in response to said manual exposure time setting means in the manual exposure control mode, and second means, located in the camera body, for controlling said adjusting means in response to said manual aperture setting means in the manual exposure control mode.

2. The improvement according to claim 1, wherein said second controlling means includes means for calculating an aperture stop-down degree from the fully open aperture size in response to said manual aperture value setting means and said first electric data received from the interchangeable objective lens.

3. The improvement according to claim 1, further comprising means for measuring light through the interchangeable objective lens with its aperture kept fully open.

4. The improvement according to claim 3, further comprising means for selecting between the manual exposure control mode and a program exposure control mode in which both exposure time and the aperture size are automatically controlled, means for calculating both the exposure time and aperture value in the program exposure control mode in response to said measuring means and said first and second electric data so that the calculated aperture value is restricted within the aperture value range defined between the first and second electric data, wherein said first controlling means is further responsive to the calculated exposure time in place of the manually set exposure time with the program exposure control mode selected, and said second controlling means is further responsive to the calculated aperture value in place of the manually set aperture value with the program exposure control mode selected.

5. The improvement according to claim 4, further comprising means, located in the interchangeable objective lens, for transmitting a third electric data representative of the focal length of the interchangeable objective lens through said common electric terminal to the camera body, wherein said exposure time and aperture value calculating means includes a plurality of exposure programs and means for adopting one of the programs in response to the third electric data, the first and second electric data being effective to restrict the calculated aperture value regardless of the selection of the program.

6. The improvement according to claim 4, wherein said mode selecting means is adapted to be capable of further selecting a shutter priority mode or an aperture priority mode, and further comprising means for calculating an aperture value in the shutter priority mode in response to said measuring means, said manually set exposure time and said first and second electric data so that the calculated aperture value is restricted within the aperture value range defined between the first and second electric data, and means for calculating an exposure time in the aperture priority mode in response to said measuring means, said manually set aperture value and said first electric data, wherein said first controlling means is responsive to the manually set exposure time in the shutter priority mode and responsive to the calculated exposure time in the aperture priority mode, and said second controlling means is responsive to the manually set aperture value in the aperture priority mode and responsive to the calculated aperture value in the shutter priority mode.

7. In a camera system having a camera body and an interchangeable objective lens removably coupled with the camera body, the improvement which comprises:
means, located in the camera body, for manually setting exposure time;
means, located in the camera body, for manually setting aperture value;
means, located in the camera body, for restricting the manual aperture value setting within an aperture value range;
means, located in the camera body, for measuring light through the interchangeable objective lens with its aperture fully open;
means, located in the camera body, for selecting one of manual, shutter priority, aperture priority and program exposure modes;
means for retaining the manually set exposure time and the manually set aperture value regardless of a selection among the manual, shutter priority, aperture priority and program exposure modes;
means, located in the camera body, for practicing an automatic exposure control calculation in one of the shutter priority, aperture priority and program exposure modes in response to at lest necessary one of the measuring means, the manually set exposure time and the manually set aperture value so that the calculated aperture value is restricted within the aperture value range;
first means located in the camera body, for controlling the shutter speed in response to the manually set or calculated exposure time;
second means, located in the camera body, for controlling the aperture size in response to the manually set or calculated aperture value;
a common electric terminal located in the interchangeable lens;
means, located in the interchangeable objective lens, for transmitting a first electric data representative of the fully open aperture size and a second electric data representative of the minimum available aperture size peculiar to the objective lens, through said common electric terminal to the camera body for the use in the restriction of manual aperture value setting in the camera body and for the use in the automatic exposure control calculation, and
means, located in the interchangeable objective lens, for adjusting the aperture size always in response to the second controlling means in any one of the manual, shutter priority, aperture priority and program exposure modes without any source of manually controlling the adjusting means within the interchangeable objective lens.

8. In a camera system capable of a manual and an automatic exposure control having a camera body and an interchangeable objective lens removably coupled with the camera body, the interchangeable objective lens comprising:
a camera electric terminal;
means for transmitting a first electric data representative of the fully open aperture size and a second electric data representative of the minimum available aperture size peculiar to the objective lens, through said common electric terminal to the camera body for the use in a restriction of manual aperture value setting in the camera body within an aperture value range defined between the first and second electric data and for use in an automatic exposure control calculation in the camera body;
means for transmitting a third electric data representative of the focal length of the interchangeable objective lens, through said common terminal to the camera body;
means for transmitting a fourth electric data representative of an error in fully open aperture metering which is to be caused by using the interchangeable objective lens, through said common terminal, and
means for adjusting the aperture size always under the control of the camera body in any one of the manual and automatic exposure control mode without any source of manually controlling the adjusting means within the interchangeable objective lens.

9. In a camera system capable of a manual and automatic exposure control having a camera body and an interchangeable objective lens removably coupled with the camera body, the interchangeable objective lens comprising:

a common electric terminal;

means for transmitting a first electric data representative of the fully open aperture size and a second electric data representative of the minimum available aperture size peculiar to the objective lens, through said common electric terminal to the camera body for use in a restriction of manual aperture value setting in the camera body within an aperture value range defined between the first and second electric data and for use in an automatic exposure control calculation in the camera body;

means for transmitting a third electric data representative of the focal length of the interchangeable objective lens, through said common electric terminal to the camera body;

means for transmitting a predetermined data common to all of the available interchangeable objective lenses in the system, through said common terminal to the camera body, and means for adjusting the aperture size always under the control of the camera body in any one of the manual and automatic exposure control modes without any source of manually controlling the adjusting means within the interchangeable objective lens.

10. In a camera system capable of a manual and automatic exposure having a camera body and an interchangeable objective lens removably coupled with the camera body, the improvement comprising:

means, located in the interchangeable objective lens, for adjusting the aperture size of the lens without any source of manually controlling the adjusting means within the interchangeable objective lens;

a common electric terminal for data transmission for the interchangeable objective lens to the camera body;

means, located in the interchangeable objective lens, for transmitting a first electric data representative of the fully open aperture size and a second data representative of the minimum available aperture size peculiar to the objective lens, through said common electric terminal to the camera body;

means, located in the interchangeable objective lens, for transmitting a third electric data representative of the focal length of the interchangeable objective lens through said common electric terminal to the camera body;

means, located in the camera body, for measuring light through the interchangeable objective lens with its aperture kept fully open;

means, located in the interchangeable objective lens, for transmitting a fourth electric data representative of an error in the fully open aperture light measurement which is inevitable depending on the interchangeable objective lens coupled with the camera body;

means, located in the camera body, for selecting between the manual exposure control mode and a program exposure control mode in which both exposure time and the aperture size are automatically controlled;

means, located in the camera body, for manually setting exposure time;

means, located in the camera body, for manually setting aperture value;

means, located in the camera body, for restricting the manual aperture value setting within an aperture value range defined between the first and second electrical data transmitted from the interchangeable objective lens;

means, located in the camera body, for calculating both the exposure time and aperture value free from the fully open aperture light measurement error in the program exposure control mode in response to said measuring means and said first, second and fourth data so that the calculated aperture value is restricted within the aperture value range defined between the first and second electric data, said calculating means including a plurality of exposure programs and means for adopting one of the programs in response to said third electric data, the first and second electric data being effective to restrict the calculated aperture value regardless of the selection of the program;

means, located in the camera body, for performing a calculation for the manual exposure control mode in response to said manual exposure time setting means and said manual aperture value setting means;

a shutter means located in the camera body;

first means, located in the camera body, for controlling said shutter means in response to the manually set or automatically calculated exposure time, and second means, located in the camera body, for controlling said adjusting means in response to the manually set or automatically calculated aperture value.

11. The improvement according to claim 10, further comprising means for retaining the manually set exposure time and the manually set aperture value against the selection between the manual and automatic exposure control modes.

* * * * *